Patented Mar. 11, 1947

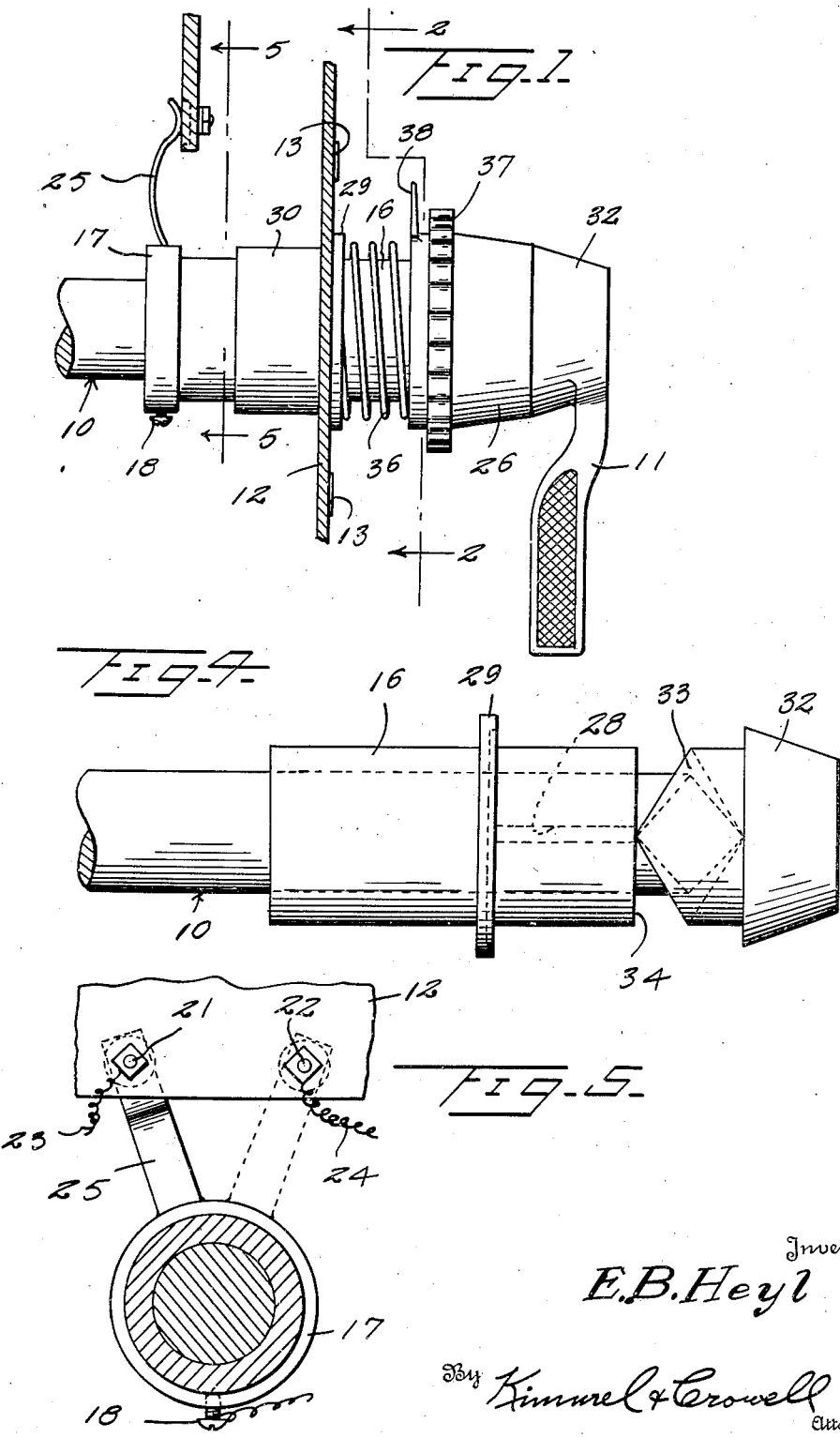
March 11, 1947.  E. B. HEYL  2,417,362
FUEL TANK AND GAUGE SELECTOR
Filed March 26, 1945  2 Sheets-Sheet 1
Inventor
E. B. Heyl
By Kimmel & Crowell
Attorneys

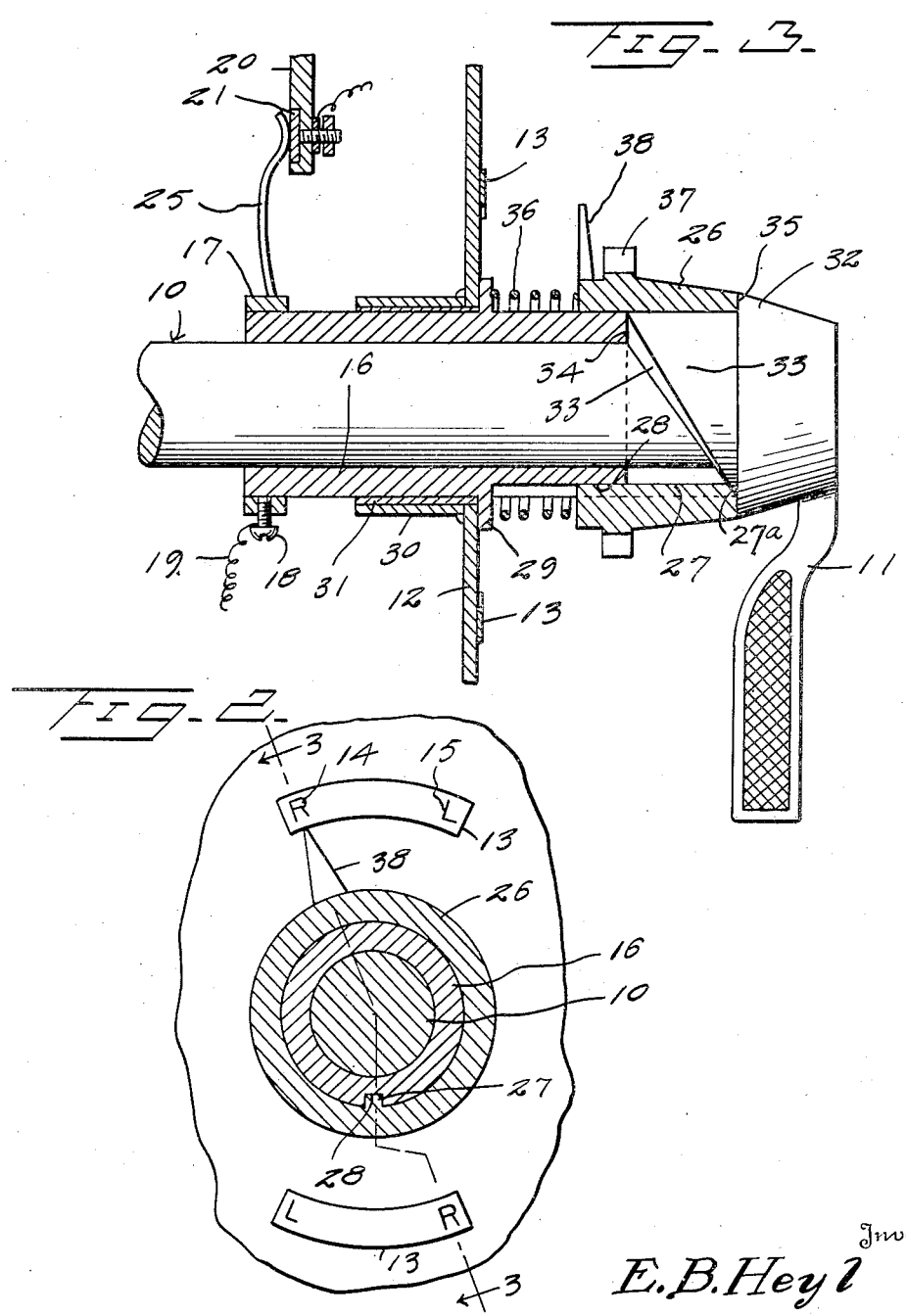

2,417,362

UNITED STATES PATENT OFFICE 2,417,362

FUEL TANK AND GAUGE SELECTOR

Edward B. Heyl, New York, N. Y.

Application March 26, 1945, Serial No. 584,954

6 Claims. (Cl. 200—53)

1

This invention relates to a safety means for the gasoline tank selector valve and the gauge selector switch for aircraft.

At the present time large aircraft are equipped with a number of gasoline tanks connected to the engine or engines, and are also equipped with a tank selector valve, by means of which the pilot may connect a selected tank with the engine. The aircraft is also equipped with an electrically operated gasoline gauge, by means of which the pilot can obtain readings of the quantity of gasoline in a selected tank.

This switch or instrument is operated by turning the same to a contact connected with the selected tank, whereupon the gauge will indicate the quantity of gasoline in such tank. The switch at present available for determining the quantity of gasoline in a selected tank is of such character that it is independent of the selector valve, and as a result the pilot who is required to perform a number of operations at substantially the same time in the operation of the aircraft and the changing of the tanks, may unwittingly move the selector switch for the tank gauge and subsequently fail to change the selector valve, so that the engine is not connected to a full tank and completely drains the first tank with which it is connected, resulting in the stoppage of the engine.

It is, therefore, an object of this invention to provide in combination with the selector valve shaft or stem a gauge operating switch which is so constructed that the switch will not only move with adjustment of the selector valve shaft or stem, but may also be moved independently of the movement of the valve stem or shaft. Where the gauge switch is moved independently, the switch upon release by the pilot will automatically return to the position for which the valve stem or shaft is set, so that the instrument board will accurately show to the pilot the exact position of the selector valve.

Another object of this invention is to provide in combination with the valve stem or shaft of a multiple valve structure a gauge operating switch, which will not only move with the movement of the valve stem or switch, but which may be independently adjusted and will automatically return to indicate the valve stem position.

To the foregoing objects and others which may hereinafter more fully appear, the invention consists of the novel construction, combination and arrangement of parts, as will be more specifically referred to and illustrated in the accompanying drawings, but it is to be understood that changes,

2 variations, and modifications may be resorted to which fall within the scope of the invention as claimed.

In the drawings:

Figure 1 is a fragmentary side elevation, partly in section, of a selector valve structure having a gauge switch mounted thereon, constructed according to an embodiment of this invention.

Figure 2 is a sectional view taken on the line 2—2 of Figure 1.

Figure 3 is a sectional view taken on the line 3—3 of Figure 2.

Figure 4 is a plan view of the valve stem or shaft, showing the automatic switch operator.

Figure 5 is a sectional view taken on the line 5—5 of Figure 1.

Referring to the drawings, the numeral 10 designates generally a valve stem or valve plug operating shaft, which is connected to a multi-port valve structure associated with an aircraft engine and connected to a plurality of gasoline or other fluid tanks in the aircraft.

The shaft 10 has secured to one end thereof an operating lever 11, which is disposed in a position convenient to the pilot, so that the latter may adjust the valve plug position in order to connect the engine with a selected tank. The shaft 10 extends through a panel or instrument board 12, which has secured thereto a pair of valve plug position indicating plates 13, having indicia 14 and 15 thereon. The example illustrated in the drawings of the valve structure with which the shaft or stem is connected is a two-port valve structure for connecting the engine to one or the other of the two tanks. It will be understood, however, that the valve structure may embody additional ports, and the switch structure to be hereinafter described will operate equally as well with valve structures having more than two ports.

The switch operating sleeve 16 is slidably mounted on the shaft 10, extending through the panel 12 and having secured to the inner end thereof a collar 17, which may be secured to the sleeve 16 in any suitable manner, and the collar 17 has connected thereto a terminal 18, with which a conductor 19 is connected. A switch panel 20 is mounted rearwardly of the panel 12 and has secured thereto a pair of contact members 21 and 22. These contact members 21 and 22 are adapted to be connected by means of conductors 23 and 24, respectively, to a gauge for indicating the quantity of fuel in a selected tank. A switch arm 25 is carried by the collar 17 and is adapted to wipe the contacts 21 and 22 upon rotation of the sleeve 16.

A sleeve, or bushing, 26 is loose on the outer end of the sleeve 16 and is held against rotation relative to the sleeve 16 by means of a key 27, engaging in a keyway 28, which is formed in the sleeve 16. Sleeve, or bushing, 26 is slidable endwise of the sleeve 16, the purpose for which will be hereinafter described. Sleeve 16 is formed with a flange 29 bearing against the outer side of the panel 12, and a bushing 30, having a bearing 31 therein, is fixed to the inner side of the panel 12 and engages about the sleeve 16 rearwardly of the flange 29.

The lever 11 includes a boss, or bushing, 32 which is secured in any suitable manner to the shaft, or stem, 10 and the boss 32 is formed with an inwardly projecting cam 33. The diameter of the cam 33 is such that this cam will bear against the outer squared end 34 of the sleeve 16. The boss 32 is larger at its inner end than the diameter of the cam 33, so as to form a shoulder 35 against which the outer end of the sleeve 26 is adapted to normally engage. A spring 36 is interposed between the inner end of the sleeve 26 and the flange 29 and provides a means whereby the sleeve 26 will be normally urged outwardly.

The sleeve 26 is formed on the periphery thereof with a fluted flange 37 and a pointer 38 is carried by the sleeve 26 inwardly from the flange 37 and is correlated with one of the index plates 13, so as to indicate the position of the contact arm with respect to the contacts 21 and 22. It will be understood that the sleeve 26 may be rotated either clockwise or counterclockwise, depending upon the tank with which the pilot decides to connect the quantity gauge.

In the use and operation of this structure the valve stem or shaft 10 has mounted thereon the cam 33, which may be formed as a part of the boss 32 and the lever 11. The contacts 21 and 22 are connected to separate fuel tanks and a fuel quantity indicating gauge. Assuming that the aircraft is operating from the right tank indicated by the character "R" and designated by the numeral 14 in Figure 3, after the engine has been operating for a period of time, the pilot before shifting the lever 11 clockwise, as viewed in Figure 2, may grasp the fluted flange 37 and turn sleeve 26 clockwise, and with this sleeve 26 turn sleeve 16 and shift switch arm 25 from contact 21 to contact 22. The electric circuit to the fuel gauge and the tank associated with contact 22 will therefore be closed, so that the pilot will be able to determine from the gauge the quantity of fuel in the second, or other tank.

After determining the quantity of fuel in the second tank by rotating sleeve 26, this sleeve may be released from the hand of the operator and spring 36 will move sleeve 26 outwardly against the shoulder 35, carried by the boss 32. As sleeve 26 moves outwardly under the tension of spring 36, this sleeve will be rotated by engagement of the end 27a of key 27 with spiral cam 33, and as sleeve 26 rotates, sleeve 16 will rotate therewith and switch arm 25 will automatically be returned to a position engaging contact 21.

It will, therefore, be apparent that if the pilot should not adjust lever 11 to rotate shaft 10 and connect the engine with the second, or other tank, the pilot will have before him a visible indication as to exactly what tank the fuel is being drained from by the engine. It will be understood that in the duties of the pilot he is frequently glancing at the fuel gauge, and if lever 11 should not be adjusted to the other or full tank, the pilot will know from a glance at the fuel gauge that the valve has not been adjusted to the full tank and can thereupon promptly adjust lever 11 to connect the engine with the second or full tank. As lever 11 is adjusted from one position to the other, sleeve 26 will rotate with lever 11, so that the pilot will know from a glance at pointer 38, the exact valve position. It will be understood that sleeve 26 may be rotated either clockwise, or counterclockwise, and this switch structure will operate in the same manner in either direction of rotation of the switch operating sleeve.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What is claimed is:

1. In combination, a valve stem, a switch correlated with said stem, and means carried partly by said stem and partly by said switch, whereby the latter may be shifted with rotation of said stem, said means being so constructed and arranged that said switch may be shifted independently of said stem and will automatically return to normal position for normal shifting with rotation of said stem.

2. In a multi-port valve structure, a rotatable valve stem, a switch including a pair of stationary contacts, a sleeve loosely carried by said stem, a swingable switch arm carried by said sleeve, and correlated means carried by said stem and sleeve whereby said sleeve may optionally be rotated with said stem or independently thereof.

3. In a multi-port valve structure as set forth in claim 2, wherein said correlated means includes complementary clutch forming cam members carried by said sleeve and stem.

4. In a multi-port valve structure, a rotatable valve stem, and a switch operatively connected to said stem, said switch including a pair of stationary contacts, a sleeve loose on said stem, a swingable switch arm carried by one end of said sleeve, a clutch forming cam member carried by said stem, an operator carried by said sleeve non-rotatable with respect to said sleeve and slidable endwise thereof, said operator including a key engageable with the cam member on said stem whereby independent rotation of said operator will effect simultaneous endwise movement thereof.

5. In a multi-port valve structure as set forth in claim 4, including a spring engageable with said operator whereby to return the latter to normal position after independent movement thereof.

6. In a multi-port valve structure as set forth in claim 4, wherein said cam member is of substantially spiral configuration.

EDWARD B. HEYL.

REFERENCES CITED

The following references are of record in the file of this patent:

UNITED STATES PATENTS

| Number | Name | Date |
| --- | --- | --- |
| 2,233,944 | Genda | Mar. 4, 1941 |